United States Patent Office 2,849,283
Patented Aug. 26, 1958

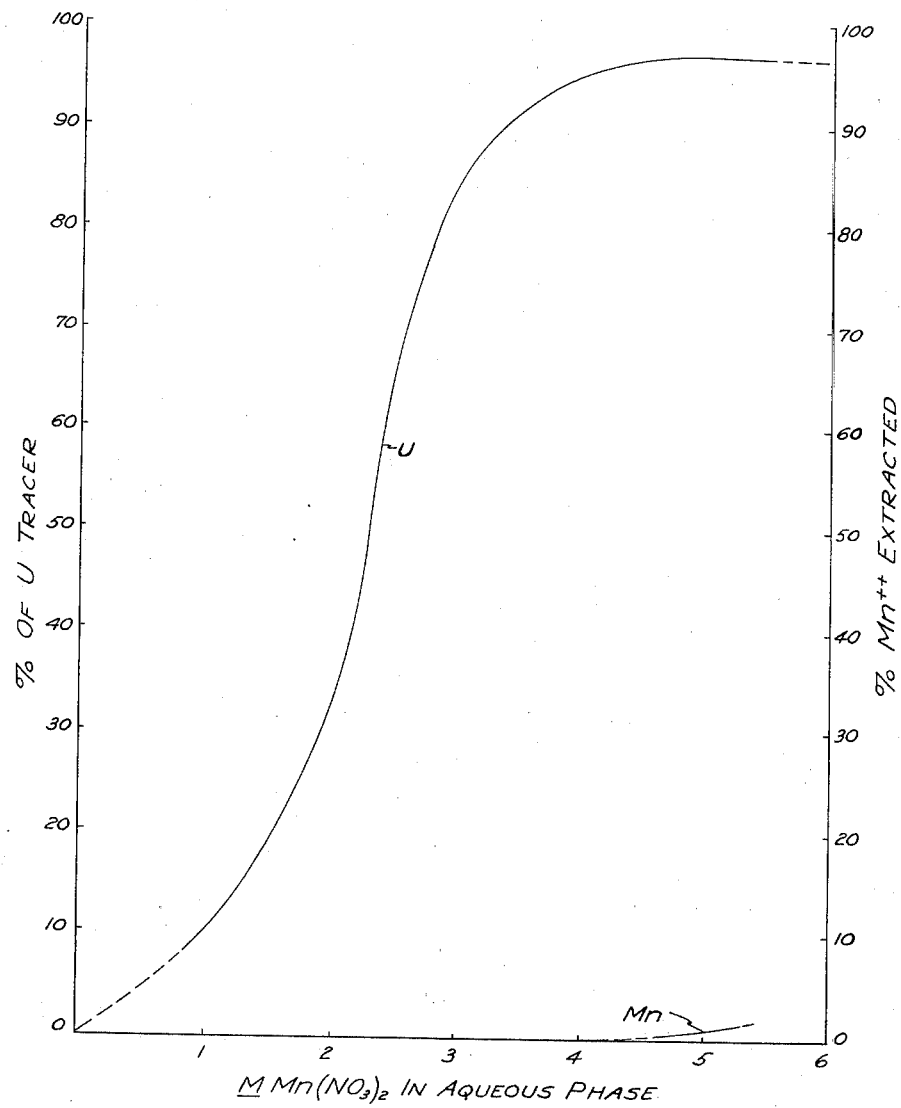

2,849,283

SEPARATION OF URANYL NITRATE BY EXTRACTION

Raymond W. Stoughton and Frank L. Steahly, Oak Ridge, Tenn., assignors to the United States of America as represented by the United States Atomic Energy Commission Application January 9, 1945, Serial No. 572,052

8 Claims. (Cl. 23—14.5)

The invention relates to the preparation of masses and compositions of the isotope of uranium having a mass number of 233, said isotope being designated as $_{92}U^{233}$ or $U^{233}$. More particularly, this invention concerns a method for the separation and recovery of $U^{233}$ by procedure which includes extraction.

The term $U^{233}$ is used to designate the element generically, either in its elemental state or combined in a compound, unless otherwise indicated by the sense in which it is used or by a specific designation such as "metal."

It is known that the bombardment of thorium with fast neutrons of energies above about 2 million electron volts (2 m. e. v.) results in a fission of the thorium.

Furthermore, it is known that $_{92}U^{238}$ initiates a series of decay products, see "Introduction of Atomic Physics," Henry Semate, page 260, etc., Farrar and Rinehart, 1939, which discloses spontaneous α-decay of $_{92}U^{238}$ to $_{90}Th^{234}$ ($UX_1$), which in turn spontaneously β-decays to $_{91}Pa^{234}$ which then in turn spontaneously β-decays to $_{92}U^{234}$ (U II). It is further shown by Semate that $_{92}U^{234}$ is an α emitter of $2.7 \times 10^5$ yr. half-life.

It is also known that the bombardment of thorium with neutrons having energies of below 1 million electron volts (1 m. e. v.) results in the production of $Pa^{233}$ and ultimately of $U^{233}$ through the prolonged decay of $Pa^{233}$, and further that $U^{233}$ so produced may undergo fission with neutrons of such low energies as below 1 million electron volts (1 m. e. v.) and even with thermal neutrons. The production of $Pa^{233}$ and/or $U^{233}$ is thus complicated by the fact that $Pa^{233}$ and/or $U^{233}$ produced by neutron bombardment may be decomposed by fission under the same bombardment.

In accordance with the present invention we have provided a method of preparing $Pa^{233}$ in substantial amounts and in concentrated form generally as a composition wherein $Pa^{233}+U^{233}$ or the compounds thereof are the preponderant components of the composition and preferably as a composition containing not in excess of about 10 percent by weight of impurities. The $U^{233}$ may be effectively prepared as a concentrate by separating $Pa^{233}$ from neutron irradiated thorium, preferably by means of a carrier such as manganese dioxide and thereafter permitting the separated $Pa^{233}$ to decay to $U^{233}$. In addition we have found the $U^{233}$ may be satisfactorily separated by certain extraction procedures described in detail hereinafter.

The reaction of thorium with slow and moderately fast neutrons may be summarized as follows:

$$_{90}Th^{232} + _0n^1 \longrightarrow {}_{90}Th^{233} + \text{gamma}$$

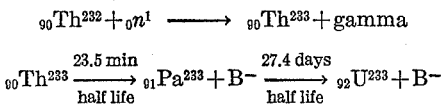

The fission products which are produced as a result of the fission of $U^{233}$ with slow and moderately fast neutrons are apparently the same as those produced by the fission of $U^{235}$. They consist of a large number of elements which generally fall into a light group with atomic numbers from 35 to 46, inclusive, and a heavy group with atomic numbers from 51 to 60, inclusive, and which undergo beta decay. The fission products which have a half life of more than three days will remain in the reaction mass in substantial quantities for at least one month after the termination of the reaction, and the removal or elimination of these products by our process is particularly advantageous. Among these products are: Sr, Y, Zr, Cb, Ru, Te, I, Xe, Cs, Ba, La, Ce of a 20 day half life, and Ce of a 200 day half life.

While the method of separation of the present invention may be applied to $U^{233}$ however prepared, for a more complete understanding of the subject matter the production of $U^{233}$ is briefly described. Further related information may be found in copending applications in the names of Seaborg, Gofman and Stoughton, Ser. No. 561,832, filed November 3, 1944, for Masses and Compositions of Radioactive Isotopes and Preparation Thereof; Ser. No. 561,833, filed November 3, 1944, for Dry Fluorine Separation Method; Ser. No. 561,836, filed November 3, 1944, for Peroxide Separation Method; and Ser. No. 561,834, filed November 3, 1944, for Composition of Matter.

In accordance with one embodiment of this invention, the mass of thorium is subjected to the action of neutrons, the majority of which have energies below 1 million electron volts, and the reaction of the neutrons with the thorium is terminated prior to the time when the neutrons are absorbed by the $U^{233}$ at the same rate that they are absorbed by the $Th^{232}$.

This limit is approximately when the weight ratio of $U^{233}$ to unreacted $Th^{232}$ is 1 to 100. In other words, the reaction of $Th^{232}$ with neutrons should preferably be terminated prior to the time when the amount of $U^{233}$ is approximately 1 percent of the amount of thorium present in the mass. When the reaction is terminated at or prior to this point there is also no danger during the reaction of a substantial decomposition of the $U^{233}$ taking place by a nuclear self-sustaining chain reaction.

It is generally desirable to terminate the reaction of the neutrons with $Th^{232}$ when the amount of $Pa^{233}+U^{233}$ is much less than 1 percent of the unreacted amount of $Th^{232}$ in order to reduce the amount of fission products and make it possible to isolate the $U^{233}$ by ordinary chemical means without the use of large quantities of special equipment such as refrigerating devices, radiation shields, special radiation resistant materials and the like. In order to reduce such special equipment to a minimum and at the same time have a practical amount of $U^{233}$ and $Pa^{233}$ for isolation, the reaction is terminated at a weight ratio of $U^{233}+Pa^{233}$ to $Th^{232}$ of not less than about 1 to 1 million and frequently between about 1 to 10,000, and 1 to 1,000.

The reaction of thorium, either in metallic state or as a compound such as an oxide or carbonate of thorium, with neutrons to produce $Pa^{233}$ and $U^{233}$ may be carried out with neutrons from any suitable neutron source. Where the neutron source provides fast neutrons, the fast neutrons are slowed to neutrons having energies of below 1 million electron volts by interposing neutron slowing material between the fast neutrons and the thorium. Such neutron slowing materials include carbon-containing, deuterium-containing, or hydrogen-containing materials such as graphite, paraffin, or deuterium oxide. Sufficient neutron slowing material is used so that at least a majority of the neutrons are slowed to energies of below about 1 million electron volts, since at higher energies there is very little production of $U^{233}$ and considerable fission of the thorium. The neutron slowing material may be interposed between the fast neutrons and the thorium-containing mass, or neutron slowing material may be admixed with the thorium. An intimate mixture of thorium with neutron slowing material may be readily obtained by using hydrated thorium compounds such as $Th(OH)_4 \cdot xH_2O$. Since the slow neutron absorption cross section of thorium is some ten to forty times larger than that of hydrogen, a ratio as high as about two to four hydrogen atoms per thorium atom may be used without losing any more than about 10 percent of the neutrons as a result of absorption by hydrogen.

While neutrons obtained from any suitable sources of high neutron output may be used, it is desirable to subject the thorium to neutrons from a high intensity source in order that suitable concentrations of $Pa^{233}$ and $U^{233}$ may be obtained in a reasonable length of time.

Preferably the thorium is subjected to slow neutrons from a source of neutrons capable of supplying at least $5 \times 10^{17}$ neutrons per second to the thorium mass and where a relatively high concentration of $Pa^{233} + U^{233}$ is desired and should weigh no more than about 20 tons. Preferably this mass should be of such a thickness that at least 50 percent and preferably 75 percent or more of the neutrons supplied are absorbed. Such high neutron intensity may be obtained by subjecting thorium to the action of neutrons obtained by slowing down secondary neutrons obtained from a self-sustaining chain reaction of $U^{233}$, $U^{235}$ or $94^{239}$ with neutrons.

By placing thorium adjacent to a neutron chain reacting mass comprising uranium and/or $94^{239}$ in amount sufficient to establish a self-sustaining neutron chain reaction, the thorium being dispersed in a neutron slowing medium such as carbon or $D_2O$, between $5 \times 10^{17}$ and $10^{20}$ neutrons per second are supplied to the thorium and at least 50 to 75 percent are absorbed so that a ratio of $Pa^{233} + U^{233}$ to $Th^{232}$ of more than 1 to 1 million may be attained in, for example, one to three months. In such a case the degree of bombardment desired may be completed before the preponderant amount of $Pa^{233}$ formed has decayed to $U^{233}$.

The method of chemical separation here involved is based upon the initial separation and recovery of $Pa^{233}$, followed by conversion of the $Pa^{233}$ to $U^{233}$ and the subsequent separation thereof.

We have found that relatively pure $U^{233}$ may be obtained by separating $Pa^{233}$ and permitting the separated $Pa^{233}$ to disintegrate to $U^{233}$ after which the $U^{233}$ may be separated by extraction. We have further found that improved extraction may be obtained by the use of an organic solvent for extracting $U^{233}$ product from an aqueous solution having a content of manganese nitrate therein, the latter functioning as a salting-out agent thereby aiding the extraction of the $U^{233}$ into the ether layer.

This invention has for one object to provide a method for the preparation and separation of masses and compositions of isotopes of uranium having a mass number of 233 referred to herein as $U^{233}$.

Another object is to provide a method of ultimately preparing $U^{233}$ which involves initially the formation of $Pa^{233}$ and the treatment thereof.

Still another object is to provide a method for the purification of $Pa^{233}$ obtained from neutron bombarded thorium compounds.

Still another object is to provide a process wherein purified $Pa^{233}$ is permitted to decay to $U^{233}$.

Still another and important object is to provide a method of separating $U^{233}$ by extraction.

Another object is to provide an extraction process which is enhanced by the presence of certain ions that may be applied to solutions containing $U^{233}$.

Another object is to provide an extraction process for $U^{233}$ utilizing an ether solvent carried out in the presence of nitrate ions.

Still another object is to provide an extraction process for isolating $U^{233}$ wherein the extract may be further treated to prepare compounds or derivatives of the $U^{233}$.

Other objects will appear hereinafter.

In general the process of our invention includes steps which may be generically described as follows:

Thorium carbonate or other suitable material which has been bombarded as above described (after the removal of any containers in which the thorium material has been inclosed) is dissolved in a suitable solvent such as 12 N nitric acid. The resultant solution is diluted with water to 1 N in nitric acid. Any precipitate forming may be removed by centrifuging.

The $Pa^{233}$ is carried down by a manganese dioxide precipitate. This is accomplished by treating the aforementioned nitric acid solution of the thorium material with potassium permanganate and manganese nitrate. Other methods of forming the manganese dioxide, as by the reaction of manganese nitrate with $NaClO_3$, or the use of preformed manganese dioxide are satisfactory. The resultant manganese dioxide precipitate carrying $Pa^{233}$ is dissolved in a hydrogen peroxide-nitric acid solution or other solvent. The solution is boiled to destroy excess peroxide.

The resulting solution is adjusted to 1 N in nitric acid. Other acid concentrations between .5 N to 6 N may be used, the 1 N representing a concentration at which easier filtering may be obtained. Another manganese dioxide precipitation is carried out by adding further potassium permanganate. In general it has been found that the carrying out of these precipitations by two or more additions of potassium permanganate is advantageous. That is, the first precipitation carries down about 90% of the $Pa^{233}$, and the second precipitation carries about 80–90% of that remaining.

The aforementioned manganese dioxide precipitation cycle is repeated several times until the $Pa^{233}$ is separated from uranium, from most of the thorium, and from the fission products initially therewith. One accomplishment of the foregoing precipitation steps is the elimination of natural uranium which may be present as an impurity in the thorium.

The $Pa^{233}$, now freed from impurities by the several precipitation cycles aforementioned, is dissolved in a suitable solvent such as nitric acid and peroxide (the excess being boiled off as above described) and permitted to stand, for example, for about two months. That is, this period is about two half-lives, hence, three-fourths of the decay would take place. Other periods may be used if desired. Preferably the volume of the solution would be reduced to a minimum by employing as small an amount of solvent as possible in the dissolution step. Also, volume reduction may be accomplished by evaporation, either under normal atmospheric pressure or reduced pressure, to concentrate the solution. Upon standing, Pa disintegrates to $U^{233}$ as above indicated.

The separation of the $U^{233}$ from the other substances brought along in the solution or formed during the decay period may be accomplished by extracting the solution with ether or other suitable solvent. The residue materials, such as manganese and the like, remain in the water layer whereas the $U^{233}$ is extracted into the solvent layer.

It has been found that if the manganese nitrate is present in a concentration between, for example, three and five molar that more than 90% of the $U^{233}$ is extracted into the ether layer. By employing three extractions, substantially complete recovery of the $U^{233}$ may be accomplished. The $U^{233}$ may be further treated or isolated from the ether layer by precipitation or other procedures as will be referred to in later description.

For a further understanding of the operation of the invention certain individual cycles are hereinafter considered in detail.

In the process as generally outlined above, during the first step pertaining to dissolving the thorium materials in nitric acid, reference is made to separating any precipitate which forms. The formation of precipitate at this point is dependent to some extent upon the initial characteristics of the thorium materials processed. In most plant processes, because of the impurities in the materials either inherently present or introduced during their preparation and fabrication, a precipitate will be present at this point and will require separation.

In the particular modification of my invention under description the thorium material irradiated was in the form of pellets. In forming these pellets a solution of stearic acid in acetone was used as a lubricant on the dies in which the pellets were compressed. Consequently, the pellets contained a thin film of stearic acid. When these pellets were dissolved in nitric acid, a scum due to the stearic acid was left in the solution. In processes where the thorium material has been fabricated by other methods, of course, such specific type of precipitate may be absent.

In many instances, in dissolving the thorium material which has been irradiated, whether initially processed in pellets or not, a certain amount of flocculent precipitate may result. The precipitate is believed to be silica, presumably present in the ores or other materials from which the thorium was obtained.

Further investigation on methods for the removal of this siliceous precipitate, since its presence may have an adverse effect upon the filtration rates of the manganese dioxide precipitates, have been carried out. It has been found that heating of the nitric acid solutions in which the thorium material is dissolved brings down a substantial part of this siliceous precipitate which in turn can be removed by centrifugation or filtering prior to carrying out the manganese dioxide precipitation.

These siliceous precipitates which are recovered, if it is expected that they contain any $Pa^{233}$, may be dissolved in hydrofluoric acid. The resultant solutions are evaporated down with nitric acid, in platinum containers or other fluoride-resistant evaporation equipment, to eliminate the hydrofluoric acid. The resultant nitric acid solution which contains any $Pa^{233}$ may be returned to the initial nitric acid solution from which the siliceous precipitate was separated.

In general, this siliceous precipitate may be largely removed by centrifuging at between 1800 and 3000 R. P. M. As a further safeguard, the centrifuged liquid may be filtered for substantially completely eliminating any siliceous material which has escaped separation by centrifuging.

In a typical run illustrating the aforementioned cycle about 20 aluminum cans containing 4,000 grams of irradiated thorium carbonate were dissolved. For removing the aluminum cans, 20% sodium hydroxide solution was used which dissolved the 380 grams of aluminum of the cans in less than two hours. Thereafter there was added 6.6 liters of 12 N nitric acid with occasional agitation. After about half an hour, heat was applied for about 2½ hours for maintaining the temperature within the range 95–105° C. Approximately 18 liters of water were added, together with further water for adjusting the volume to 24 liters, thereby making the solution one normal in nitric acid.

The siliceous precipitate which formed was separated by centrifuging at approxilmately 3,000 R. P. M. in an 8 inch stainless steel centrifuge bowl. The solution thus separated was filtered and collected in a receiver and was ready for manganese dioxide precipitation cycles.

In order to provide a more complete understanding of the manganese dioxide procedure, this operation is now described in detail.

The thorium nitrate solution freed of siliceous precipitate was treated with a source of manganese ions such as a 50% manganese nitrate solution. About 47 cc. of such a solution of a specific gravity of 1.54 were added per liter of thorium nitrate solution. The solution was heated to boiling and kept at boiling for one-half hour. During this period about 255 cc. of a 5% potassium permanganate solution was added in three portions of 85 cc. per portion at ten minute intervals.

A manganese dioxide precipitate formed and this was separated by filtration. The precipitate was washed with a one normal nitric acid solution.

The precipitate was redissolved. A nitric acid-hydrogen peroxide solution made up of 37 cc. of 30% hydrogen peroxide and 134 cc. of 12 N nitric acid was the composition of the solvent used. Sufficient solvent is used to dissolve the precipitate, preferably avoiding the use of excess.

The peroxide reducing agent was included for the purpose of reducing the manganese dioxide to manganous nitrate. Hydrazine and hydroxylamine or other similar reducing agents may be used in place of the peroxide. However, for simplified operation and ease in destruction of excess reducing agent, the use of the peroxide is preferred.

After the precipitate has been dissolved by repeated application of the solvent, the resultant solution is heated for about half an hour at 90° C. for removing excess peroxide. The solution is then ready for another manganese dioxide precipitation. The further manganese dioxide precipitation, of which there may be several, are carried out substantially as described above, using several additions of the permanganate. However, since the volumes are gradually being reduced, the quantities of precipitate obtained may be smaller. In general, it has been found that the normality of the solution should be about one normal in nitric acid. The potassium permanganate is added gradually, for example, in three portions at ten minute intervals. The solution is preferably heated near the boiling point for at least a half an hour. A manganese nitrate concentration of 20 grams or less per liter gives some improvement in filterability over higher concentrations. The presence of small amounts of materials such as sodium nitrate and aluminum nitrate, resulting from the dissolving of the aluminum cans, has no harmful effect.

Further information respecting several of these manganese dioxide cycles may be observed from the following table:

a. Start of first cycle: 24 liter basis, grams

| | |
|---|---|
| $Mn(NO_3)_2$ | 36 |
| $Th(NO_3)_4.4H_2O$ | 7,200 |
| $Th^{+4}$ | 3,000 |
| Total $MnO_2$ precipitate | 26.4 |
| First $MnO_2$ precipitate | 17.6 |
| Second $MnO_2$ precipitate | 8.8 | b. Start of second cycle: 8.6 liter basis, grams

| | |
|---|---|
| $Mn(NO_3)_2$ | 163 |
| $Th(NO_3)_4.4H_2O$ | 188 |
| $Th^{+4}$ | 79 |
| Total $MnO_2$ precipitate | 9.45 |
| First $MnO_2$ precipitate | 6.30 |
| Second $MnO_2$ precipitate | 3.15 | c. Start of third cycle: 1.033 liter basis, grams

| | |
|---|---|
| $Mn(NO_3)_2$ | 19.4 |
| $Th(NO_3)_4.4H_2O$ | 22.5 |
| $Th^{+4}$ | 9.45 |
| Total $MnO_2$ precipitate | 8.4 |
| First $MnO_2$ precipitate | 5.6 |
| Second $MnO_2$ precipitate | 2.8 |

In the above table, the figures in the first cycle represent the quantities involved in a single batch of 24 liters, the entire first cycle involving three such batches. Thus the total volume of the three batches at the start of the first cycle was reduced from approximately 72 liters to the 8.6 liters at the start of the second cycle. This latter volume resulting after dissolving the combined $MnO_2$ precipitates of the first cycle. Likewise the aggregate of $MnO_2$ precipitated in the three batches of the first cycle was reduced from 79 grams to 9.45 grams in the single batch of the second cycle.

In the second cycle the 8.6 liters were reduced to slightly over one liter. The precipitate was reduced from 9.45 grams to 8.4 grams but could have been reduced by a factor of ten or greater. However, because of handling considerations it was not desired to so reduce the quantity of precipitate. In larger batches both volume of solution and quantity of precipitate would be reduced in each cycle by our manganese dioxide precipitation by a factor of 10 or greater until the desired degree of concentration is obtained. In general the concentration of $Pa^{233}$ in $MnO_2$ may be readily carried out until there is at least 1% $Pa^{233}$ in the $MnO_2$ and even several percent may be desirable under some conditions. The above described procedure is particularly useful for obtaining concentration by a factor between 8 to 20 as may be desired.

At the end of the third cycle the volume was reduced from 1.033 l. to 133 cc. which was then further reduced to 24 cc. by evaporation. As indicated from the above, the concentration of $Th^{+4}$ in a sixty can run is reduced from (3000×3) 9000 grams at the start of first cycle to 8.4 grams at the end of the third cycle. The thorium concentration in the second and third cycle is based upon the assumption that the weight of $Th^{+4}$ carried with the $MnO_2$ precipitate is equal to the weight of the $MnO_2$ precipitated. The solution volume reduction is from (24×3) 72 liters to 24 cc.

As indicated, the $Pa^{233}$ after purification by the several manganese dioxide precipitations is permitted to decay into $U^{233}$. This occurs in approximately 2 months, namely, about two $Pa^{233}$ half lives. The solution in which the decay occurs will contain manganese nitrate, nitric acid, and some thorium nitrate which has been carried along with the manganese dioxide precipitates.

In accordance with the present invention, it has been found that separation of the $U^{233}$ from such a mixture may be conveniently accomplished by a solvent extraction, as with ethyl ether. In order to illustrate the optimum conditions for this extraction cycle, a number of ether extraction runs are described below in some detail.

Illustrations concerning these runs which were carried out using a U tracer are set forth in the following table:

| M Mn(NO$_3$)$_2$ | Run No. | 1st extraction, percent extracted of total added U tracer | K | 2nd extraction | | K | 3rd extraction | |
|---|---|---|---|---|---|---|---|---|
| | | | | Percent extracted of total added U tracer | Percent extracted of "remaining" U tracer | | Percent extracted of total added U tracer | Percent extracted of "remaining" U tracer |
| 3.0 | 1 | 69 | 11.2 | 16 | 52 | 5.3 | 7.3 | 49 |
| | 2 | 59 | 7.3 | 23 | 51 | 5.2 | 4.3 | 22 |
| 4.3 | 1 | 82 | 22 | 14 | 77 | 16 | 4.3 | 100 |
| | 2 | 77 | 16 | 19 | 80 | 22 | 4 | 91 |
| | 3 | 83 | 27.5 | 13 | 87 | 29 | 1.5 | 68 |
| | 4 | 75 | 15 | 22 | 89 | 39 | | |

From these data it may be observed that with an ether-water ratio of one to five, approximately 80% of $U^{233}$ would be extracted into each ether portion from a 4.3 M manganese nitrate solution. About 60% would be extracted from a 3 M manganese nitrate solution. Hence, it is apparent that by continuous ether extraction substantially quantitative recovery may be accomplished. Still further runs which were carried out were as follows:

180 ml. of solution 3 N in $HNO_3$ and 0.5 M in $Mn(NO_3)_2$ and containing 6000 counts per minute of uranium tracer were slowly evaporated below the boiling point to 30 ml. The resulting solution, 3 M in $Mn(NO_3)_2$, was extracted with three consecutive 6 ml. portions of ether. The tracer was removed from the ether extracts and counted on platinum discs. The results of this run are indicated in the following table:

| | Counts per minute | Percent extracted of original added tracer | Percent extracted of extractable tracer (i. e., left after previous extractions) |
|---|---|---|---|
| 1st 6 ml. ether extract | 3,800 | 63 | 63 |
| 2nd 6 ml. ether extract | 1,420 | 24 | 65 |
| 3rd 6 ml. ether extract | 692 | 11 | 8 |

The information on ether extraction may be graphically illustrated as shown in the attached drawing forming a part of the present application. Referring to this drawing it will be noted that the presence of nitrate ions improves the partition coefficient and thereby will facilitate the quantitative extraction of $U^{233}$ into the solvent layer. It will be further noted that manganese nitrate is particularly advantageous in that very little of the manganese enters the solvent layer.

After the $U^{233}$ has been segregated in the solvent layer, it may be stripped to a water layer and recovered therefrom in any desired manner. The exact manner of further treating the $U^{233}$ would be dependent upon the particular use to which it is desired to put the $U^{233}$ and upon related factors; hence, the invention is not to be limited in this respect. The further treatment of the $U^{233}$ may include one or more of the following operations: Further ether extraction, ferric hydroxide-hydroxylamine cycles, ammonium uranate precipitation, uranium peroxide precipitation or precipitation of the $U^{233}$ with acridine hydrochloride and thiocyanate. For example, details relative to the latter method may be found in Mikrochemie 25, 71 (1938) by A. Langer. The aforementioned methods do not form a part of the present invention; consequently, extended description appears unnecessary.

The foregoing has illustrated in some detail the individual operations which may be employed to make up our process. For the purposes of illustration there is now set forth a consolidated example:

Aluminum cans containing thorium carbonate for $U^{233}$ production were removed from neutron irradiation after about 20 days' exposure to slow neutrons. The aluminum cans were dissolved in 20% sodium hydroxide, after which the carbonate pellets were dissolved in 12 N nitric acid; a moderate amount of flocculent precipitate resulted from this treatment. After dilution to 300 gm. $Th(NO_3)_4 \cdot 4H_2O$ per liter and 1 N nitric acid, this precipitate was centrifuged, and from the centrifugate 1.1 gm. $MnO_2$ per liter was removed in two separate portions. The $MnO_2$ was precipitated by the action of potassium permanganate on manganous nitrate and each portion brought with it about 90% of the $Pa^{+5}$ which was in solution before precipitation; thus, the two portions removed about 98% of the $Pa^{233}$ originally present. The $MnO_2$ precipitates, after filtration, were dissolved in hydrogen peroxide-nitric acid solutions, and the resulting solutions were then combined and boiled for 20 to 30 minutes to destroy excess peroxide. The process thus far constitutes one cycle.

The second cycle involves dilution of the solution containing $Mn(NO_3)_2$, $Th(NO_3)_4$ (brought along with the $MnO_2$, $Pa^{233}$ and nitric acid to about 20 gm. $Mn(NO_3)_2$ per liter and an acidity of 1 N, after which $MnO_2$ is again precipitated in two portions by adding the proper amount of $KMnO_4$. The $MnO_2$ precipitated, amounting to about 10% of that removed previously, is then treated as in the first cycle, ending up with a solution of $Mn(NO_3)_2$, some $Th(NO_3)_4$, $Pa^{233}$, and about 7 N in $HNO_3$. This cycle then concentrates the $Pa^{233}$ with respect to the manganese carrier by a factor of about 10 and further removes any natural uranium impurity (originally present in the thorium compound) by a factor of about 100.

A third similar cycle with no further reduction in amount of manganese was carried out. The purpose of this cycle was merely to further reduce the possibility of contamination of the $U^{233}$ by natural uranium impurities, since any uranium left with the $Pa^{233}$ while it is allowed to decay will be found in the final product. The $Mn(NO_3)_2$ solution obtained by dissolving the resulting $MnO_2$ was left as concentrated as possible and with as small an amount of $HNO_3$ as possible.

The $Mn(NO_3)_2$ (containing the $Pa^{233}$) resulting from the third cycle was boiled down, under reduced pressure, to about 4 molar and let stand behind shields until a large portion (probably three-fourths) of the $Pa^{233}$ (27.4 day half-life) disintegrated. Then an ether extraction in the presence of nitrate ions was applied, thus removing the $U^{223}$ from the $Mn(NO_3)_2$, from the thorium nitrate brought along by the $MnO_2$, and from the remaining $Pa^{233}$ and other radio-active substances.

While in the preceding example the treatment of thorium carbonate which has been irradiated for 20 days has been described, our invention is not limited to this material or this particular length of treatment. Other thorium compounds which have been irradiated substantially greater periods of time may be processed in a comparable manner. Likewise, the process may be modified by using other solvents than those indicated or by using other concentrations of the nitric acid solvent which has been referred to in the examples described. Furthermore, other acids such as hydrochloric acid and sulfuric acid may be used in place of nitric acid, dependent upon apparatus limitations. Nitric acid appears to be the least corrosive of the common acids and is, therefore, preferred. Solvents such as dibutyl carbitol, hexone and the like may be used in place of ether.

It is to be understood that all matter contained in the above description and examples shall be interpreted as illustrative and not limitative of the scope of this invention, and it is intended to claim the present invention as broadly as possible in view of the prior art.

We claim:

1. A process for deriving a uranium isotope from an aqueous solution containing a beta-emitting isotope of protactinium, which comprises forming a precipitate in said solution whereby said protactinium is removed from the aqueous phase by association with said precipitate, separating said precipitate and its associated protactinium from the supernatant solution, forming an aqueous nitric acid solution from said precipitate and its associated material, effecting sufficient aging subsequent to said precipitation to permit substantial decay of protactinium into uranium, providing a substantial concentration of manganous nitrate in the resulting nitric acid solution containing uranyl nitrate, contacting the resulting solution with a substantially water-immiscible organic solvent having at least one ether linkage, and separating the resulting organic phase containing dissolved uranyl nitrate.

2. The process of claim 1 in which the precipitate is manganese dioxide.

3. The process of claim 1 in which the precipitate is manganese dioxide and the manganous nitrate concentration is 2.4–4.5 molar.

4. The process of claim 1 wherein said organic solvent is diethyl ether.

5. The process of claim 1 wherein said manganous nitrate concentration is 2.5–4.5 molar.

6. The process of claim 1 wherein said manganous nitrate concentration is 2.5–4.5 molar, and the total nitrate concentration in said resulting solution is 5–10 molar.

7. The process of claim 1 wherein said precipitate is manganese dioxide, said manganous nitrate concentration is 2.5–4.5 molar, the total nitrate concentration in said resulting solution is 5–10 molar, and said organic solvent is diethyl ether.

8. A process for deriving a uranium isotope from an aqueous solution containing a beta-emitting isotope of protactinium, which comprises forming a precipitate in said solution whereby said protactinium is removed from the aqueous phase by association with said precipitate, separating said precipitate and its associated protactinium from the supernatant solution, forming an aqueous nitric acid solution from said precipitate and its associated material, effecting sufficient aging subsequent to said precipitation to permit substantial decay of protactinum into uranium, providing a substantial concentration of manganous nitrate in the resulting nitric acid solution containing uranyl nitrate, contacting the resulting solution with a substantially water-immiscible organic solvent, and separating the resulting organic phase containing dissolved uranyl nitrate.

References Cited in the file of this patent

UNITED STATES PATENTS 2,227,833    Hixson et al. _____ Jan. 7, 1941

OTHER REFERENCES

Mellor: "Inorganic and Theoretical Chemistry," vol. 4, pp. 119–120, Longmans, London, 1923.

Misciatelli, Chemical Abstracts, vol. 25, pp. 1452-3, 1931.

Lowry: "Inorganic Chemistry," 2nd Ed., p. 1057, 1931.

Hopkins: "Chapters in the Chemistry of the Less Familiar Elements," vol. II, chapter 18, p. 7, Stipes Publ. Co., Champaign, Ill., 1937.

UNITED STATES PATENT OFFICE
CERTIFICATE OF CORRECTION

Patent No. 2,849,283                                                August 26, 1958

Raymond W. Stoughton et al

It is hereby certified that error appears in the printed specification of the above numbered patent requiring correction and that the said Letters Patent should read as corrected below.

Column 8, line 12, in the table, fourth column thereof, third item, for "8" read -- 85 --; column 9, line 5, for "$MnO_2$, $Pa^{233}$" read -- $MnO_2$), $Pa^{233}$ --; line 32, for "$U^{223}$" read -- $U^{233}$ --; column 10, line 17, claim 3, for "2.4—4.5 molar" read -- 2.5—4.5 molar --.

Signed and sealed this 8th day of September 1959.

(SEAL)
Attest:

KARL H. AXLINE                                                ROBERT C. WATSON
Attesting Officer                                           Commissioner of Patents

UNITED STATES PATENT OFFICE
CERTIFICATE OF CORRECTION

Patent No. 2,849,283                                        August 26, 1958

Raymond W. Stoughton et al

It is hereby certified that error appears in the printed specification of the above numbered patent requiring correction and that the said Letters Patent should read as corrected below.

Column 8, line 12, in the table, fourth column thereof, third item, for "8" read -- 85 --; column 9, line 5, for "$MnO_2$, $Pa^{233}$" read -- $MnO_2$), $Pa^{233}$ --; line 32, for "$U^{223}$" read -- $U^{233}$ --; column 10, line 17, claim 3, for "2.4--4.5 molar" read -- 2.5--4.5 molar --.

Signed and sealed this 8th day of September 1959.

(SEAL)
Attest:

KARL H. AXLINE                                                                  ROBERT C. WATSON
Attesting Officer                                                    Commissioner of Patents